United States Patent
Lambert et al.

(12)

(10) Patent No.: US 6,476,142 B1
(45) Date of Patent: Nov. 5, 2002

(54) CROSSLINKABLE VINYLIDENE FLUORIDE POLYMER COMPOSITION, PROCESS FOR CROSSLINKING THE COMPOSITION AND SHAPED ARTICLES

(75) Inventors: Yves-Julien Lambert, Chaumont-Gistoux (BE); Vincent Thulliez, Brussels (BE); Guy Laurent, Vedrin (BE)

(73) Assignee: Solvay (Societe Anonyme), Brussels (BE)

( * ) Notice: Subject to any disclaimer, the term of this patent is extended or adjusted under 35 U.S.C. 154(b) by 0 days.

(21) Appl. No.: 09/704,534

(22) Filed: Nov. 3, 2000

Related U.S. Application Data

(62) Division of application No. 08/721,025, filed on Sep. 26, 1996, now Pat. No. 6,156,847.

(30) Foreign Application Priority Data

Oct. 5, 1995  (FR) .............................................. 95 11843

(51) Int. Cl.$^7$ ................................................. C08L 27/16
(52) U.S. Cl. ....................... 525/193; 525/199; 522/109; 522/112
(58) Field of Search ................................. 522/112, 109; 525/193, 199

(56) References Cited

U.S. PATENT DOCUMENTS 3,852,429 A    12/1974   Murayama
4,595,720 A    6/1986    Stivers et al. ................ 524/100
5,429,849 A    7/1995    Lasson et al. ............... 525/199
5,451,640 A    9/1995    Yamashita ................... 525/276

FOREIGN PATENT DOCUMENTS

JP    011758      1/1987
JP    62-11758    1/1997

OTHER PUBLICATIONS

Alger "Polymer Science Directionary" p. 232.
P. Chadeyron et al.: Conditions de Radioreticulation d' un elastomere fluore et evolution de ses proprietes rheologiques avec la dose d' irradiation'. In: Rev. Gen. Caout. Plast., vol. 50, No. 11, 1973, Paris, pp. 921–926.
Chemical Abstract 87: 40491.

*Primary Examiner*—David J. Buttner
(74) *Attorney, Agent, or Firm*—Marina V. Schneller; Venable, Baetjer, Howard & Civiletti, LLP

(57) ABSTRACT

Composition which can be crosslinked under the effect of an ionizing radiation comprising a thermoplastic copolymer of vinylidene fluoride and of chlorotrifluoroethylene and an effective amount of a crosslinking promoter, such as a triallyl cyanurate or triallyl isocyanurate.

Process for the crosslinking by irradiation of the crosslinkable composition under air by means of an ionizing radiation, such as β-radiation, at a dose of 10 to 100 kGray.

Crosslinkable and crosslinked shaped articles, such as sheaths for electrical cables and pipes for oil products.

5 Claims, No Drawings

CROSSLINKABLE VINYLIDENE FLUORIDE POLYMER COMPOSITION, PROCESS FOR CROSSLINKING THE COMPOSITION AND SHAPED ARTICLES

This is a divisional of application Ser. No. 08/721,025 filed Sep. 26, 1996, now U.S. Pat. No. 6,156,847, the disclosure of which is incorporated herein by reference.

The present invention relates to a crosslinkable vinylidene fluoride polymer composition, to a process for crosslinking the composition and to crosslinked shaped articles.

By virtue of their greater flexibility, by comparison with the. poly(vinylidene fluoride) homo-polymer, vinylidene fluoride copolymers and their mixtures with poly(vinylidene fluoride) have many applications in fields such as the sheathing of electrical cables or the preparation of flexible fuel pipes. In these applications, it is highly desirable to be able to combine their inherent properties, such as flexibility and high resistance to fire and to corrosion, with improved mechanical and thermomechanical (after heat aging) properties.

It is known that the crosslinking of polymers and in particular of thermoplastic polymers generally causes an improvement in the mechanical properties and in the chemical resistance, as well as an improvement in their impermeability. However, it is most often accompanied by a relatively great stiffening.

A. Vokal and M. Pallanova (cf. 7th Symp. on Radiation Chemistry, 1990, pp. 311–315) have studied the crosslinking of homopolymers and of copolymers of vinylidene fluoride (VF2) with hexafluoropropylene (HFP) in the presence of crosslinking promoters under the effect of ionizing radiation at doses of 100 to 400 kGray (10 to 40 Mrad). This study shows that VF2-HFP copolymers are easier to crosslink than the homopolymer, that is to say that for identical doses of irradiation, the copolymers exhibit markedly higher contents of gel (levels of insolubles in a solvent for the non-crosslinked copolymer) than the homopolymer. Nevertheless, the crosslinking of VF2-HFP copolymers takes place to the detriment of the breaking stress and of the flexibility of the shaped items.

The present invention is targeted at providing a crosslinkable composition based on vinylidene fluoride polymers which does not exhibit this disadvantage.

To this end, the invention relates to a vinylidene fluoride polymer composition which can be crosslinked under the effect of an ionizing radiation, characterized in that the vinylidene fluoride polymer comprises a thermoplastic copolymer of vinylidene fluoride and of chlorotrifluoroethylene and in that the composition contains an effective amount of crosslinking promoter.

The vinylidene fluoride polymer present in the crosslinkable compositions according to the invention can be composed essentially of thermoplastic copolymers of VF2 and of CTFE. It can also be composed of a mixture of such copolymers and of vinylidene fluoride homopolymer. In this case, the copolymer of vinylidene fluoride and of chlorotrifluoroethylene and the vinylidene fluoride homopolymer are most often present in a ratio by weight of 75/25 to 25/75.

Thermoplastic copolymer of vinylidene fluoride and of chlorotrifluoroethylene is understood to denote, for the purposes of the present invention, vinylidene fluoride copolymers which contain up to approximately 25% by weight of chlorotrifluoroethylene. Advantageously, they contain at least 10% by weight thereof. Preferably, they contain from 12 to 22% by weight thereof. These preferred copolymers exhibit melting temperatures from approximately 170 to approximately 165° C.

The nature of the crosslinking promoter is not critical. The latter can therefore be chosen from conventional promoters of crosslinking under the effect of an ionizing radiation. Mention may be made, as non-limiting examples of promoters which can be used, of triallyl cyanurate and isocyanurate, allyl esters of polycarboxylic acids, such as diallyl phthalate and tetraallyl pyromellitate, bismaleimides, such as N,N'-ethylenebismaleimide, or multiacrylates, such as dipenta-erythritol hexamethacrylate. Preference is nevertheless given to triallyl cyanurate and to triallyl isocyanurate and more particularly still to the latter, which has a beneficial effect on the lubrication of the crosslinkable compositions according to the invention.

The effective amount of crosslinking promoter is understood to denote an amount which is sufficient to promote crosslinking under the effect of ionizing radiation. Although this amount is not particularly critical, use is generally made of at least 0.5 part and most often of at least one part by weight of crosslinking promoter per 100 parts by weight in total of vinylidene fluoride polymer. Generally, a content of 5 parts by weight is not exceeded. Advantageously, the crosslinking promoter is present in an amount of 2 to 4 parts per 100 parts by weight in total of vinylidene fluoride polymer.

Particularly preferred compositions according to the invention contain a copolymer of vinylidene fluoride and of chlorotrifluoroethylene containing from 12 to 22% by weight of chlorotrifluoroethylene, optionally as a mixture with poly(vinylidene fluoride) homopolymer in the ratio by weight 70/30 to 30/70, and from 2 to 4 parts of triallyl isocyanurate (crosslinking promoter) per 100 parts by weight in total of vinylidene fluoride polymer.

It is understood that, in addition to the essential constituents which constitute the vinylidene fluoride copolymer, optionally vinylidene fluoride homopolymer, and the crosslinking promoter, the crosslinkable compositions according to the invention can comprise all the usual processing ingredients of compositions based on fluorinated polymers, such as, for example, lubricants, as well as various additives, such as fillers, pigments and/or dyes, flame-retardant agents, smoke-suppressants, and the like.

The crosslinkable compositions according to the invention can be manufactured in any known conventional way for mixing polymers and their various processing ingredients. They can, for example, be manufactured by mixing, in a single or in a number of operations, all the ingredients in a low-temperature fast mixer in order to produce non-pregelled compositions existing in the powder form, generally known as premixes. They can also be manufactured by mixing, in a single or in a number of operations, all the ingredients in an extruder in which the mixture is brought to a temperature at least equal to the melting temperature of the vinylidene fluoride polymer in order to produce pregelled mixes, generally known as compound mixtures. The crosslinkable compositions according to the invention are advantageously provided in the compound form and in particular in the form of granules.

The compositions according to the invention can be processed by all the conventional techniques for the conversion of plastics in the molten state, such as extrusion and injection. They are particularly suitable for being processed by extrusion.

The crosslinkable compositions according to the invention are readily crosslinked in air under the effect of relatively low doses of ionizing radiation.

The invention also relates to a process for the crosslinking of the compositions according to the invention. According to this process, the composition is irradiated in air by means of an ionizing radiation at a dose which does not exceed 100 kGray. This dose most often amounts to at least 10 kGray. Excellent results are obtained with irradiation doses of 50 to 90 kGray.

The nature of the ionizing radiation is not critical in carrying out the crosslinking process according to the invention. The ionizing radiation can be composed, for example, of β-rays (accelerated electrons) or alternatively of λ-rays (emitted by a cobalt source). Nevertheless, due to their greater accessibility, preference is given to β-rays.

The compositions crosslinked according to the process of the invention exhibit high levels of crosslinking. Crosslinking is reflected in practice by the level of gel. The latter is evaluated by immersion of an irradiated polymer sample in a boiling solvent which dissolves the non-crosslinked polymer fraction. The content of insoluble materials, expressed in percent, corresponds to the level of gel representative of the level of crosslinking. Generally, the level of gel of the compositions crosslinked according to the process of the invention (evaluated by immersion for thirty minutes in boiling dimethylformamide) amounts to more than 50% and, most often, to more than 60%.

An advantage of the compositions crosslinked according to the invention is the fact that they exhibit an improved tensile breaking stress in comparison with an identical non-crosslinked composition, including after severe heat aging, for example at temperatures exceeding 200° C. It is true that the crosslinked compositions exhibit a reduced flexibility in comparison with an identical non-crosslinked composition. Nevertheless, the flexibility of the crosslinked compositions remains superior to that of a non-crosslinked vinylidene fluoride homopolymer and, moreover, largely sufficient to satisfy the standards laid down in certain fields of application, such as that of cable manufacture.

In addition, it has been found that, when the crosslinked composition is subjected to heat aging, the flexibility is significantly improved to the point of being able to achieve values equivalent to, if not greater than, those of non-crosslinked compositions.

According to a specific embodiment of the crosslinking process according to the invention, the composition is subjected after irradiation to a heat treatment. This heat treatment can be carried out at very variable temperatures and for equally variable time periods. To give an idea, the temperature will generally amount to at least 80° C. and most often to at least 100° C. The latter will not generally exceed 215° C. and most often it will not exceed 200° C. The duration of the heat treatment can range from a few hours to a few days. The optimum conditions for the heat treatment, temperature and duration, will advantageously be evaluated experimentally in each specific case.

The crosslinkable compositions according to the invention are capable of being shaped into highly diverse articles which, after crosslinking and heat aging, combine excellent mechanical properties with excellent flexibility.

Due to these advantageous properties, the crosslinkable compositions according to the invention are particularly suitable for the sheathing of electrical cables, such as communication cables, and for the extrusion of pipes intended for the transportation of fuel in automobiles (fuel lines) or alternatively of multilayer structures intended for the transportation of oil, in particular in marine environments (offshore).

The invention also relates to the crosslinkable shaped articles resulting from the conversion in the molten state of the crosslinkable composition according to the invention. It also relates to the crosslinked shaped articles resulting from the crosslinking by means of the process of the invention of the crosslinkable shaped articles.

These crosslinkable and crosslinked shaped articles are composed, preferably, of sheaths for electrical cables and of pipes for oil products.

The following examples are intended to illustrate the invention.

In all the examples, the crosslinking promoter used is triallyl isocyanurate employed in the proportion of 3 parts per 100 parts by weight of vinylidene fluoride polymer.

Examples 1 to 9 relate to crosslinkable compositions (Examples 1, 6 and 8) and to crosslinked compositions (Examples 2 to 5 and 7) in which the vinylidene fluoride polymer is a copolymer of vinylidene fluoride and of chlorotrifluoroethylene ($VF_2$-CTFE copolymer).

Examples 10 and 11 relate to a crosslinkable composition (Example 10) and to a crosslinked composition (Example 11) in which the vinylidene fluoride polymer is composed of a mixture of copolymer of vinylidene fluoride and of chlorotrifluoroethylene ($VF_2$-CTFE) and of poly(vinylidene fluoride) homopolymer (PVDF). The melt index of the homopolymer, measured at 230° C. under a load of 5 kg, amounts to 1.5 g/10 min.

In Examples 1 to 7, 10 and 11, the vinylidene fluoride copolymer contains 15% by weight of chlorotrifluoroethylene and its melting temperature amounts to 168° C.

In Examples 1 to 5, this copolymer exhibits a melt index, at 230° C. under 2.16 kg, of 7.1 g/10 min. In Examples 6 and 7, this index amounts to 4.7 g/10 min. In Examples 10 and 11, this copolymer exhibits a melt index, at 230° C. under 2.16 kg, of 5 g/10 min.

In Examples 8 and 9, the vinylidene fluoride copolymer contains 20% by weight of chlorotrifluoroethylene and its melting temperature amounts to 165° C. This copolymer exhibits a melt index (as defined above) of 6.5 g/10 min.

In Examples 1 to 5, the results of which appear in Table I, various tensile mechanical properties have been evaluated at 23° C. —200 mm/min (according to ASTM D 638) on a sheet with a thickness of 0.5 mm manufactured by compression moulding. The granules employed for moulding the sheet were obtained by extruding the following composition, all the parts being expressed by weight:

| | |
|---|---|
| VF2-CTFE copolymer | 100 parts |
| triallyl isocyanurate | 3 parts |

Compression moulding is carried out under the following conditions:
  mixing for 10 minutes at 200° C. on a roll mill;
  pressing in a press for 2 min at 200° C. under 40 bar;
  pressing in a press for 10 min at room temperature under 50 bars.

Sheet samples were irradiated using variable doses of β-rays, except in Reference Example 1. The sheets crosslinked by irradiation were, moreover, subjected to heat treatment at 212° C. for 7 days.

The results of the measurements are summed in Table I. The level of gel expresses the amount of insoluble solid matter, expressed at %, after immersion of the polymer in boiling dimethylformamide.

Comparison of the results of Reference Example 1 (crosslinkable composition) with the results of Examples 2 to 5 (crosslinked compositions) abundantly shows the improvement in the tensile mechanical properties, such as yield stress and breaking stress. It also shows that the heat treatment at 212° C. for 7 days following the crosslinking results in an appreciable improvement in the modulus of elasticity and in the elongation at break, the values of which approach, indeed exceed, those of the reference, while maintaining a greater breaking stress than the latter.

In Examples 6 to 9, the results of which appear in Table II, various tensile mechanical properties were evaluated at 23° C. —50 mm/min (according to ASTM D 638) on an extruded pipe, the external diameter of which amounts to 3 mm and the thickness of the wall to 0.5 mm.

The granules employed to extrude the pipe were obtained by extruding the following composition, all the parts being expressed by weight:

| | |
|---|---|
| VF2-CTFE copolymer | 100 parts |
| triallyl isocyanurate | 3 parts |

The pipe is extruded at the rate of 20 m/min on a cable-manufacturing line with a screw exhibiting the following characteristics:

L=24D diameter : 30 mm degree of compression: 30

The heat conditions for the extrusion were as follows:

| temperature profile: | zone 1 | 175° C. |
|---|---|---|
| | zone 2 | 180° C. |
| | zone 3 | 190° C. |
| | zone 4 | 200° C. |
| | adapter | 210° C. |
| | head | 210° C. |
| | die | 210° C. |

The temperature of the material at the outlet of the extruder amounted to 210° C. and the extruded pipes were cooled in water at 20° C.

Pipe samples were irradiated using A-rays at the dose 75 kGray (Examples 7 and 9). The pipe samples according to Reference Examples 6 and 8 (crosslinkable compositions) were not irradiated. The irradiated and crosslinked pipe samples were, moreover, subjected to heat treatment at 120° C. for 1 day.

The results of the measurements carried out are summed in Table II.

Comparison of the results of Reference Example 6 with those of Example 7 and, moreover, of Reference Example 8 with those of Example 9 shows the appreciable improvement in the tensile mechanical properties and in particular the improvement in the yield stress and breaking stress after heat treatment at 120° C. for 1 day.

In Examples 10 and 11, the results of which appear in Table III, the tensile yield stress and the tensile elongation at yield (yield=flow threshold) at 23° C. and at 50 mm/min (according to ASTM standard D 638) were measured on ISO 2 test specimens with a thickness of 2 mm removed from extruded strips. The granules employed for extruding the strips were obtained by extruding the following composition, all the parts being expressed by weight:

| | |
|---|---|
| VF2-CTFE copolymer | 66 parts |
| PVDF homopolymer | 33 parts |
| precipitated calcium carbonate | 0.1 part |
| polyethylene wax | 0.2 part |
| triallyl isocyanurate | 3 parts |

The strips were extruded on a single-screw extruder (diameter: 19 mm; L=25D) with a temperature profile ranging from 170 to 210° C.

For the preparation of Reference Example 10 (crosslinkable composition), the strip samples were not irradiated nor subjected to heat treatment.

For the preparation of Example 11 (crosslinked composition), strip samples were irradiated using β-rays at the dose of 75 kGray (in three passes of 25 kGray) and then subjected to heat treatment: 1 day at 120° C. (heat treatment proper) followed by 60 days at 212° C. (heat aging). Before heat treatment, the level of gel in the crosslinked samples (evaluated by immersion for 30 minutes in boiling dimethylformamide) amounted to 78%.

The results of the measurements are summed up in Table III. Comparison of the results of Example 10 with those of Example 11 abundantly shows that the crosslinked composition retains good flow properties after heat aging for 60 days at 212° C.

TABLE I

| No. of the Example | 1 (R) | 2 | 3 | 4 | 5 |
|---|---|---|---|---|---|
| Dose of β-radiation, kGray | 0 | 50 | 50 | 80 | 80 |
| Heat treatment | none | none | 7 d at 212° C. | none | 7 d at 212° C. |
| Level of gel, % | 1 | 67 | 75 | 72 | 82 |
| Tensile mechanical properties at 23° C. - 200 mm/min | | | | | |
| Yield stress, MPa | 16.4 | 23 | 17.2 | 22.2 | 17.4 |
| Elongation at yield, % | 12.9 | 9.5 | 9.6 | 14.8 | 15.2 |
| Breaking stress, MPa | 15.4 | 22.4 | 18.9 | 23 | 20.4 |
| Elongation at break, % | 238 | 231 | 260 | 171 | 241 |
| Modulus of elasticity (1 mm/min), MPa | 329 | 552 | 345 | 482 | 271 |

TABLE II

| No. of the Example | 6 (R) | 7 | 8 (R) | 9 |
|---|---|---|---|---|
| Dose of β-radiation, kGray | 0 | 75 | 0 | 75 |
| Heat treatment | none | 1 d at 120° C. | none | 1 d at 120° C. |
| Level of gel, % | <1 | 75 | <1 | 74 |
| Tensile mechanical properties at 23° C. - 50 mm/min | | | | |
| Yield stress, MPa | 15.7 | 23.0 | 11.9 | 16.9 |
| Elongation at yield, % | 14.8 | 25.0 | 19.3 | 26.2 |
| Breaking stress, MPa | 32.0 | 36.9 | 25.3 | 28.3 |
| Elongation at break, % | 481 | 314 | 560 | 313 |

TABLE III

| No. of the Example | 10 (R) | 11 |
|---|---|---|
| Dose of β-radiation, kGray | none | 75 |
| Heat treatment | none | 1 d at 120° C.*, then 60 d at 212° C.** |

TABLE III-continued

| | | |
|---|---|---|
| Level of gel, % | <1 | 82*<br>83** |
| Tensile mechanical properties at 23° C. - 50 mm/min | | |
| Yield stress, MPa | 33.5 | 35 |
| Elongation at yield, % | 11.5 | 11 |

What is claimed is:

1. A vinylidene fluoride polymer composition which can be crosslinked under the effect of an ionizing radiation; comprising
 a mixture of a thermoplastic copolymer of vinylidene fluoride and of chlorotrifluoroethylene; with a poly(vinylidene fluoride) homopolymer in a ratio by weight of 75/25 to 25/75; and an effective amount of a crosslinking promoter.

2. The crosslinkable composition of claim 1, wherein the copolymer of vinylidene fluoride and of chlorotrifluoroethylene contains from 10 to 25% by weight of chlorotrifluoroethylene.

3. The crosslinkable composition of claim 1, wherein the crosslinking promoter is present in an amount which is at least 0.5 part and which does not exceed 5 parts per 100 parts by weight of the mixture of the thermoplastic copolymer of vinylidene fluoride and of chlorotrifluoroethylene with the poly(vinylidene fluoride) homopolymer.

4. The crosslinkable composition of claim 1, wherein the crosslinking promoter is selected from the group consisting of triallyl cyanurate and triallyl isocyanurate.

5. A crosslinkable shaped article formed by a process comprising converting the composition of claim 1 to the molten state.

* * * * *